US008095642B1

(12) United States Patent
Martin et al.

(10) Patent No.: US 8,095,642 B1
(45) Date of Patent: Jan. 10, 2012

(54) METHOD AND APPARATUS FOR DYNAMICALLY ADJUSTING FREQUENCY OF BACKGROUND-DOWNLOADS

(75) Inventors: Geoff S. Martin, Overland Park, KS (US); Jonathan R. Kindred, Gardner, KS (US); Kevin E. Hunter, Olathe, KS (US); Brian R. Landers, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 847 days.

(21) Appl. No.: 11/280,031

(22) Filed: Nov. 16, 2005

(51) Int. Cl.
*G06F 15/173* (2006.01)
(52) U.S. Cl. .......................... 709/224; 709/225
(58) Field of Classification Search ................. 709/218, 709/219
See application file for complete search history.

(56) References Cited

U.S. PATENT DOCUMENTS

| | | | |
|---|---|---|---|
| 5,918,014 A | 6/1999 | Robinson | |
| 6,629,284 B1 | 9/2003 | Leermakers | |
| 6,763,354 B2 | 7/2004 | Hosken | |
| 6,996,609 B2 * | 2/2006 | Hickman et al. | 709/218 |
| 7,107,406 B2 * | 9/2006 | Kurasugi | 711/137 |
| 7,200,390 B1 * | 4/2007 | Henager et al. | 455/419 |
| 2001/0034814 A1 * | 10/2001 | Rosenzweig | 711/118 |
| 2003/0018751 A1 * | 1/2003 | Lee et al. | 709/219 |
| 2004/0117442 A1 * | 6/2004 | Thielen | 709/203 |
| 2005/0132295 A1 | 6/2005 | Noll et al. | |
| 2005/0154608 A1 | 7/2005 | Paulson et al. | |
| 2006/0094404 A1 | 5/2006 | Burgess | |
| 2006/0179123 A1 * | 8/2006 | Smith | 709/218 |
| 2007/0198468 A1 | 8/2007 | Berger | |

OTHER PUBLICATIONS

Steve Corman, "The George Concept," http://george.asu.edu/concept.htm, printed from the World Wide Web on Mar. 31, 2005.
"Push: The next wave of Net news?," http://www.jdlasica.com/articles/push.html, printed from the World Wide Web on Mar. 31, 2005.
"XML.com: What is RSS?," http://www.xml.com/pub/a/2002/12/18/dive-into-xml.html, printed from the World Wide Web on Apr. 4, 2005.
Office Action from U.S. Appl. No. 11/432,930, dated Jun. 25, 2009.
U.S. Appl. No. 11/432,930, filed May 12, 2006.

* cited by examiner

*Primary Examiner* — Firmin Backer
*Assistant Examiner* — Keyvan Emdadi

(57) ABSTRACT

A method and apparatus for automatically adjusting the frequency of content background-downloading. An apparatus such as a cell phone, personal digital assistant, or computer, will be set to perform background-downloads of content at a particular frequency. The apparatus will then determine the frequency with which a user accesses background-downloaded content on the device, and the apparatus will use the determined frequency as a basis to automatically adjust the background-download frequency. For instance, if the user-access frequency is greater than the background-download frequency, then the apparatus may increase the background-download frequency, whereas, if the user-access frequency is less than the background-download frequency, then the apparatus may decrease the background-download frequency.

19 Claims, 5 Drawing Sheets

METHOD AND APPARATUS FOR DYNAMICALLY ADJUSTING FREQUENCY OF BACKGROUND-DOWNLOADS

FIELD OF THE INVENTION

The present invention relates to wireless communications and, more particularly, to management of background downloads to wireless communication devices such as a cell phones for instance.

BACKGROUND

With the widespread growth of the Internet and wireless communications, users of wireless communication devices can conveniently gain access to a virtually unlimited quantity of information and services. In a typical arrangement, for instance, a wireless communication device such as a cell phone or personal digital assistant will be equipped with a wireless web browser or a specialized communication application through which a user can browse to desired web sites and download a variety of content. Further, it is also possible to "push" web content to a wireless communication device by sending a specially encoded SMS message (e.g., a WAP Push message or an MMS message) to the device that causes the device to engage in a wireless web session and to download specified content.

SUMMARY

The present invention is directed to a method and system for managing background-downloading of content to a wireless communication device. As a general matter, a device "background downloads" content by automatically downloading the content without receiving an express user directive at the time to do so, i.e., by downloading the content in the "background." Such automated downloading can conveniently make content available for local access by a user of the device without requiring the user to wait for the device to download the content at the time. Further, background downloading can be especially useful in the context of wireless communications, where devices tend to have sporadic or limited network connectivity. In that context, a wireless device may background-download content while online, and a user of the device may thereafter access the content from local data storage regardless of whether the device is online or offline at the time.

Background-downloading can be set to occur periodically or aperiodically, pursuant to trigger logic in the device itself or trigger logic maintained in a network server. By way of example, the device can be programmed to periodically background-download the most current set of content available from a particular network address (e.g., URL), and the device may do so by sending an HTTP request or other content request to the designated address. As another example, a network server may be programmed to periodically send a download-trigger message (such as a WAP Push or MMS message) to the wireless device to cause the device to download a most current set of content, and in each instance the device may responsively do so.

An example application of background-downloading is downloading of one or more "content-channels" to a wireless device. In practice, the wireless device may be programmed with a channel-presentation program that allows a user to selectively view content of one or more channels (akin to TV channels), each of which may be focused on a particular subject (such as sports, weather, or pop-music, for instance).

For each channel, the channel-presentation program may include or have local access to a channel-definition that specifies a particular network address (e.g., URL) from which the program should background-download the most current channel content. Thus, pursuant to the channel-definition data, the channel-presentation program (and thus the device) may periodically or aperiodically download the latest set of content available for each defined channel. Conveniently, whenever a user of the device then selects a desired channel in the channel-presentation program, the program can present the user with the latest set of content that was background-downloaded for that channel, without having to wait for the device to download the content.

Another example application of background-downloading is downloading of a content-catalog, i.e., a listing of downloadable-content, such as content that is available for free-download or for purchase. Traditionally, a network server would maintain the most current version of such a catalog online so that a user could operate a web browser to browse to the catalog and see what content is available. Unfortunately, however, as the quantity of available content grows and thus as the size of the content catalog grows, it can become quite time-consuming to download or browse through the catalog in real-time online, particularly from a wireless device having a limited-bandwidth connection. Advantageously, background-downloading can be used instead to maintain on the device itself a copy of the most up-to-date content catalog (as of the latest download), so that a user of the device can readily view the latest content catalog without needing to wait for the device to download the catalog.

As presently contemplated, these or other background-downloads can be customized based on an automated prediction of what type of information would be of most interest to the device user. Such prediction can be accomplished by establishing normative data regarding the location (e.g., geographic location) and online interaction of a population of users over time and then using that normative data as a basis to predict what type of information is likely to be of interest to the user given the user's current location and the current time (i.e., time, time, time/date, or the like).

For example, online transaction records can be compiled for a population of users over time, with each record indicating the respective user's location, the current time, and the content acquired. To select content to be background-downloaded to a particular user at a particular time, the user's location may be determined, and then the collected transaction records can be searched to find any and all transaction records matching (i.e., within an acceptable tolerance, whether or not exact) the user's current location and time. (Preferably, the acquired records are for transactions in which the user engaged in the past, but transaction records for transactions in which other users engaged could be used as well or instead.)

For each past transaction record thus identified, the content indicated by the transaction record can then be compared with each piece of content available for possible background-downloading to the user, and each piece of available content can thus be scored based on its similarity to the content indicated by the transaction record. As a result, each piece of available content may have a number of scores, based on a comparison with each past transaction history record identified. For simplicity, all but the highest score for each piece of available content may be disregarded.

Given scores for each piece of available content, the pieces of available content having the highest scores (but preferably not representing content that has already been acquired by the user) may be selected to be background-downloaded to the user. In one embodiment, the top N pieces of available content may be selected and combined together into a single set of content (e.g., as a portal document), and that single set of content may then be background downloaded to the user.

In practice, this prediction and customization function can be used to provide a customized content channel for presentation to a user through a channel-presentation program like that described above for instance. By way of example, the channel-presentation program may be equipped with a "custom channel" definition pointing to a particular URL, and a network server (e.g., a server hosting the designated URL) can carry out the prediction and content-customization functions. Thus, each time the device background-downloads a content-update for the customized content channel, the device would obtain content that is predicted to be of interest based on the predictive model.

In addition, the prediction and customization function can be used to provide an abridged content-catalog or an otherwise customized content-catalog through background-download to the device. For example, a network server may carry out the prediction function to identify catalog entries that are likely to be of interest to the user, in view of the user's online transaction history and current physical location, and the network server may compile a customized content-catalog having catalog entries selected based on that prediction. (In this case, the pieces of available content may be the catalog entries, each representing particular content.) Each time the device background-downloads an updated version of the content-catalog, the device may thus obtain a content-catalog that is customized (e.g., abridged from the full catalog) based on the user's predicted interest.

As further contemplated, the frequency with which these or other background-downloads are conducted can be varied automatically based on the frequency with which a user (or users) of the device tends to access the background-downloaded content on the device. For example, a channel-presentation program may be arranged by default to background-download content for a particular channel at a certain frequency, such as every 3 hours for instance. If the program detects that a user accesses that channel on average every hour, however, then the program may automatically change its update frequency for that channel, to be once an hour for instance. Similarly, the device may be arranged by default to background-download an updated content-catalog at a certain frequency, such as once a day for instance. If logic on the device detects that a user accesses the content-catalog on average every 2 hours, however, then the logic may automatically change the content-catalog update frequency, to be once ever 2 hours for instance.

These as well as other aspects, advantages, and alternatives will become more apparent to those of ordinary skill in the art by reading the following detailed description with reference where appropriate to the accompanying drawings.

DETAILED DESCRIPTION

Figure 1:
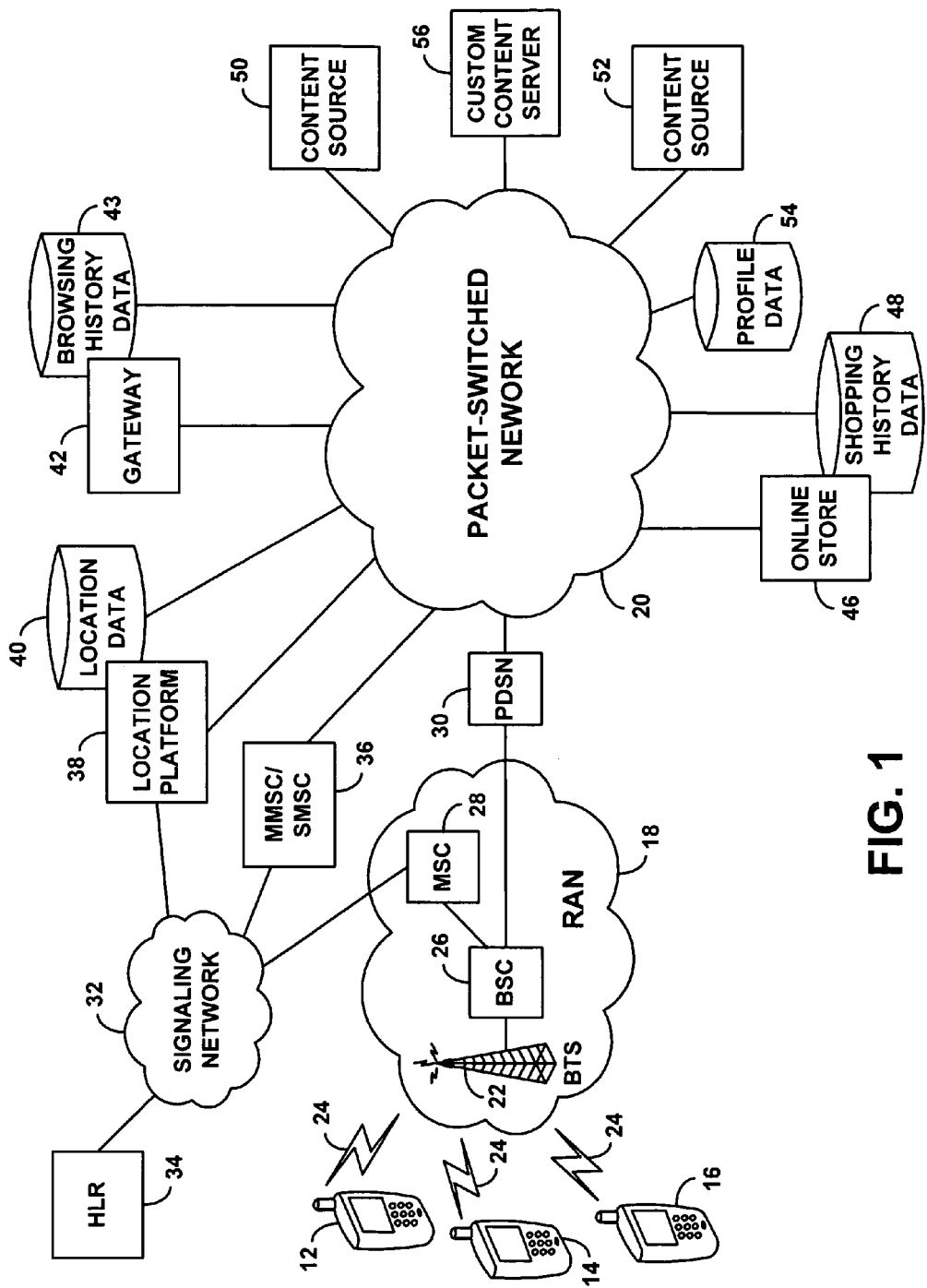
FIG. 1 is a simplified block diagram of a communication system in which an exemplary embodiment of the invention can be implemented.

Referring to the drawings, FIG. 1 is a simplified block diagram of a communication system in which an exemplary embodiment of the invention can be implemented. It should be understood, of course, that this and other arrangements and functions described herein are provided by way of example only and that numerous variations may be possible. For instance, elements can be added, omitted, combined, distributed, reordered, repositioned, or otherwise changed while remaining within the scope of the invention as defined by the claims. Further, it should be understood that various functions described herein can be carried out by hardware, firmware, and/or software (e.g., one or more processors programmed with machine language instructions to carry out the functions).

Shown by way of example in the system of FIG. 1 are several wireless communication devices 12, 14, 16, each served by a radio access network (RAN) 18 that provides connectivity with a packet-switched network 20. Although three wireless devices are shown, any number could be provided. Further, although all three devices are shown served by a common RAN, they could be served by separate RANs. It is also possible that one or more landline devices may be included and considered in the system as well.

Each wireless device is generally capable of engaging in wireless communication with RAN 18 and, through RAN 18, engaging in packet-data communication on network 20. As such, each device can take various forms, such as a packet-data capable cell phone, a wirelessly-equipped personal digital assistant (PDA), or a wirelessly-equipped personal computer for instance.

Figure 2:
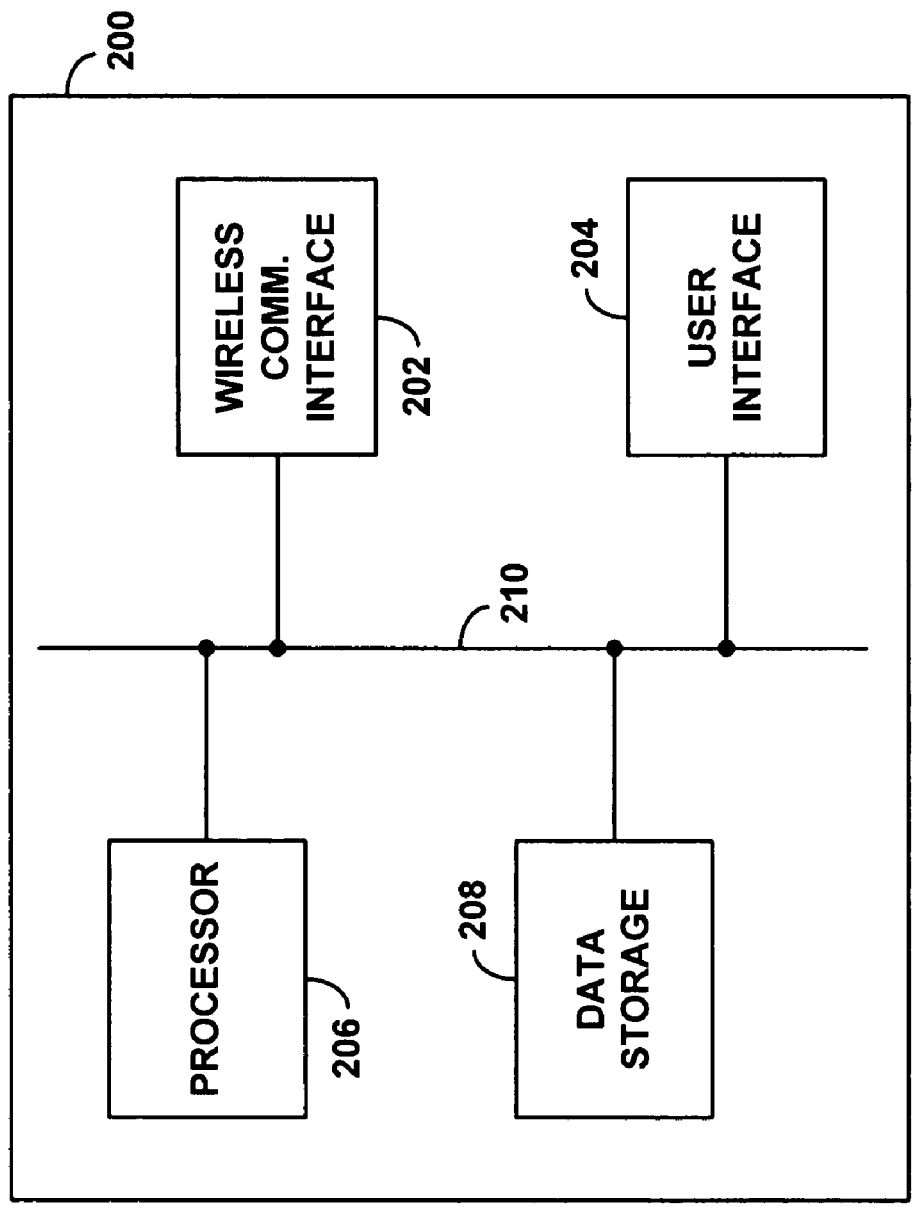
FIG. 2 is a simplified block diagram of a wireless communication device operable in the exemplary embodiment to receive custom background-downloads and to dynamically adjust background-download frequency.

FIG. 2 is a block diagram of an exemplary wireless device 200. As illustrated in FIG. 2, the exemplary wireless device includes a wireless communication interface 202, a user interface 204, a processor 206, and data storage 208, all of which may be coupled together by a system bus, network, or other mechanism 210.

Wireless communication interface 202 may comprise a chipset and antenna arranged to facilitate wireless communication with RAN 18 according to an air-interface protocol, such as CDMA, TDMA, GSM, or any other air-interface protocol now known or later developed.

Exemplary chipsets include the well known "MSM" series of chipsets available from Qualcomm Incorporated. User interface 204, in turn, comprises input/output components, such as a display, a speaker, a keypad, and a microphone, for presenting content and other information to a user and for receiving input from a user.

Processor 206 may comprise one or more general purpose processors (e.g., INTEL microprocessors) and/or one or more special purpose processors (e.g., digital signal processors). Data storage 208, in turn, may comprise one or more volatile and/or nonvolatile storage components such as magnetic, optical, or organic storage, and may be integrated in whole or in part with processor 206. Data storage 208 preferably contains program instructions (e.g., machine language instructions) executable by processor 206 to carry out various functions described herein, such as acquiring packet-data connectivity, background-downloading customized content, and dynamically changing background-download frequency.

Returning now to FIG. 1, RAN 18 is shown by way of example including a base transceiver station (BTS) 22 and a base station controller (BSC) 24. BTS 22 radiates to define one or more wireless coverage areas in which wireless devices such as devices 12, 14, 16 can communicate with the BTS 22 over an air interface 24, according to an agreed air-interface protocol. BTS 22 is then coupled with BSC 26, which manages aspects of communications over air interface 24. BSC 26 is in turn coupled with a mobile switching center (MSC) 28, which provides connectivity with the PSTN (not shown), and BSC 26 is further coupled with a packet data serving node (PDSN) 30, which provides connectivity with packet-switched network 20.

RAN 18 and other components of FIG. 1 are preferably arranged to support wireless packet-data communications, so that wireless devices 12, 14, 16 can communicate with entities on packet-switched network 20. In an exemplary system, a wireless device may acquire wireless packet-data connectivity by first transmitting a packet-data origination-request over an air interface access channel to the RAN 18. Upon receipt of the request, BSC 26 may then establish a radio link layer connection with the device and may signal to PDSN 30 to facilitate establishment of a packet-data connection, and PDSN 30 may set up a data link layer connection (e.g., point-to-point protocol (PPP) session) with the device. Further, the PDSN or a Mobile-IP home agent (not shown) may then assign an IP address to the device, so the device can then engage in IP communications on network 20 via its radio link and data link layer connections. Other procedures for establishing and using a wireless packet-data connection are possible as well, depending on the air interface protocol used for instance.

As further shown in FIG. 1, MSC 28 (or more generally RAN 18) is coupled with a signaling network 32, such as a Signaling System #7 (SS7) network, for instance. Signaling network 32 facilitates signaling communication between the RAN 18 and various other entities, such as a home location register (HLR) 34, a messaging service center 36, and a location platform 38. These various entities may take various forms.

HLR 34 functions in a well known manner to maintain wireless-device service profiles and to deliver a copy of a device's service profile to the MSC that is currently serving the device. Typically, HLR 34 also maintains a record of the last known location of each wireless device, such as the cell, cell sector, or MSC serving-area where the device last registered for service, for instance.

Messaging center 36 comprises a short messaging service center (SMSC) and/or a multimedia messaging service center (MMSC), for instance, arranged in a well known manner to facilitate transmission of text and/or multimedia messages to wireless devices. As further shown, messaging center 36 preferably also sits as a node on packet-switched network 20, so that messaging center 36 can receive messages that are being transmitted from other entities on the network 20 to wireless devices served by RAN 18.

As an SMSC, messaging center 36 may receive an SMS message (e.g., an industry standard SMDPP message) destined to a wireless device and may forward the message to the MSC that is currently serving the wireless device to facilitate transmission of the message over the air to the device. As an MMSC, on the other hand, messaging center 36 may receive an MMS message carrying content for delivery to a wireless device, and the MMSC may store the content and send a specially-coded SMS message to the device, providing the device with a URL pointing to the stored content. Upon receipt of the SMS message, the device may then acquire a packet-data connection if it does not have one already and then download the content from the designated URL (e.g., with HTTP messaging).

Location platform 38 is representative of possibly many location platforms, each of which may comprise a mobile positioning center (MPC) and a position determining entity (PDE), arranged in a well known manner to determine, store, and report the location of wireless devices. Like messaging center 36, location platform 38 preferably sits as a node on packet-switched network 20. That way, the location platform 38 can receive location-queries from other entities on the network 20 and can responsively report wireless device location to those entities.

Location-platform 38 may be programmed to automatically monitor and track the location of designated wireless devices over time and to maintain records of those locations in location-data storage 40, which may also be accessible via network 20. In practice, location-platform 38 may store the location records in a relational database format, indicating for each wireless device where the device was located at particular times/days. That way, it would be possible to determine where a device was located at a specified time. In a preferred embodiment, the location history data will use encrypted device identifiers (or encrypted user identifiers) in order to protect user privacy.

Location-platform 38 may be arranged to determine the location of a wireless device in any way now known or later developed. For example, location platform 38 may be arranged to query HLR 34 via signaling network 32, to determine the last registered location of the device. As another example, location platform 38 may be arranged to query RAN 18 via signaling network 32, to obtain an indication of the device's location or to obtain data that the location platform can then use to determine the device's location (e.g., using advanced forward link trilateration (AFLT) or another mechanism). Location-platform 38 may further store and/or report location in various forms, such as geographic location coordinates, street addresses, city or state identifications, wireless coverage area identifications, or even type of location (such as, generically, "park," "shopping mall," "school," "roadway," etc.), and either expressly or through use of associated location-identifier codes.

Packet-switched network 20 generally functions to carry packet-data communications between network entities, according to the well known Internet Protocol (IP) for instance. Network 20 may comprise one or more public and/or private networks and will typically include multiple routers, switches, and other devices for routing packet traffic from point to point in a known manner.

Shown sitting as nodes on packet-switched network 20, in addition to the entities discussed above, are a gateway 42, an online store 46, content sources 50, 52, a profile data store 54, and a custom content server 56, each of which may take various forms.

Gateway 42 is representative of possibly many gateways, each of which may function to support packet-data communications by wireless devices. In practice, gateway 42 may sit on a private packet-data network owned and operated by a wireless carrier that serves the devices. Substantially all packet-data communications to/from each wireless device may then be made to pass through the gateway 42, so that the gateway can authorize, translate, and/or otherwise manage the packet-data communications. To cause packet-data communications to pass through gateway 42, each wireless device could be programmed to use the gateway as its IP proxy server. Alternatively, PDSN 30 could be programmed to shunt all packet-data communications from the wireless devices to gateway 42, for transmission in turn to their designated destinations. Thus, outgoing packet-data communications from each device would pass through the gateway 42, and incoming packet-data communications being transmitted in response to each device would similarly pass through the gateway 42.

Gateway 42 may programmatically track the browsing history of wireless devices over time, maintaining in browsing history data storage 44 a record of network locations that the devices visited over time and/or content that they acquired over time. In particular, as a wireless device sends outgoing packet-data communication to particular URLs and/or as the device receives incoming packet-data communications in response, gateway 42 may make a record of those communication in browsing history data storage 43.

For each communication, gateway 42 may establish a transaction record in browsing history data storage 43 and may include in the transaction record various pieces of information regarding the communication. For instance, the gateway may include in the transaction record an encrypted device ID or user ID (e.g., an NAI), the time of the communication, and the URL visited. Further, the gateway may ascertain a description of the content acquired, such as by referencing a stored data table that maps URLs with content-descriptors, by reading a content-descriptor from the content itself (e.g., content-descriptor metadata provided within a returned HTML document), or by examining the content itself and applying pattern matching logic to characterize the content, and may include a corresponding content-descriptor (e.g., metadata) in the transaction record.

Still further, the gateway 42 may record with transaction record in data storage 43 an indication of where the device was located at the time of the communication. Gateway 42 may determine the device's location by querying location-platform 38. Alternatively, the device itself may programmatically include an indication of its GPS-determined location within its outgoing communication, such as in an HTTP query parameter for instance. Still alternatively, gateway 42 or another entity could correlate the transaction record data with the location-history data maintained by location-platform (based on common identifiers, timestamps, etc.), after the fact, to determine where the device was located at the time of the communication indicated by the transaction record.

Online store 46 is representative of possibly many online stores, such as one operated by the owner of RAN 18 or by a third party content provider, service provider, or merchandise provider for instance. Online store 46 may comprise one or more computers with which wireless devices (and others) can interact in order to acquire content of various sorts (e.g., music, videos, screen savers, ringtones, games, text articles, etc.) for a fee or for free. Online store 46 may operate at a particular IP address having an associated domain name on network 20, so that a wireless device user can browse to the store and acquire content.

Online store 46 may programmatically track the shopping history of wireless devices over time, maintaining a record of their shopping history in shopping history data storage 48. In particular, for each shopping transaction (e.g., purchasing content or merchandise, or perhaps even putting content in an online shopping cart), online store 46 may establish a transaction record in shopping history data storage 48 and may include in the transaction record various pieces of information regarding the transaction. For instance, the online store may include in the transaction record an encrypted device ID or user ID (e.g., NAI), the time of the transaction, and a description of the content that was the focus of the transaction. The online store would preferably maintain a content-descriptor (e.g., metadata) for each such piece of content, and the online store may thus include that content-descriptor in the transaction record.

Further, online store 46 may record with each shopping history record in data storage 48 an indication of where the device was located at the time of the transaction. Online store 46 may determine the device's location by querying location-platform 38. Alternatively, the device itself may include an indication of its location within its outgoing communication to the online store. Still alternatively, online store 46 or another entity could correlate the shopping history data with the location-history data maintained by location-platform, after the fact, to determine where the device was located at the time the device acquired particular content from the online store.

Content sources 50, 52 are representative of possibly many content servers that supply content for delivery to client devices. The content sources may comprise web servers, web portals, streaming media servers, or other types of content sources, making particular types of content available at particular URLs or other network addresses. In some cases, a wireless device might acquire content directly from a content source, such as by browsing to its URL. In other cases, a wireless device might acquire content from a server that in turn acquires content from one or more of the content sources. Preferably, all such communications by the wireless device will pass through gateway 42 as noted above, so that gateway 42 can track the types of content acquired by devices. Alternatively or additionally, the content sources themselves might programmatically track content acquisition.

Profile data storage 54 may contain data defining service profile information for various wireless devices, including an indication per wireless devices of whether the device subscribes to the customized background-downloading service presently contemplated. A wireless carrier may maintain profile data storage 54 and may provision it with data regarding each device, in the same way the carrier provisions HLR 34 or other entities with subscriber service profile data.

Figure 3:
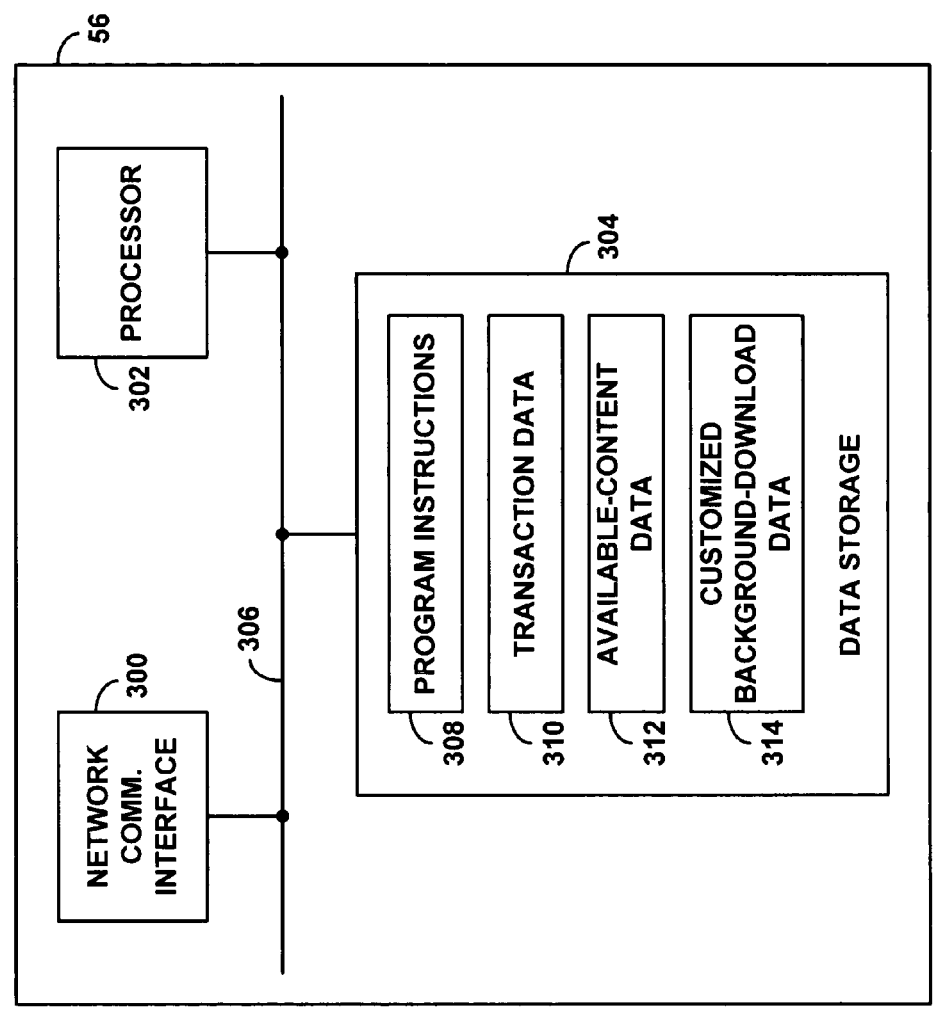
FIG. 3 is a simplified block diagram of a server arranged in accordance with the exemplary embodiment to compile customized content for background-downloading to wireless client devices.

Custom content server 56 comprises one or more computer servers arranged to compile and deliver customized background-downloads to wireless devices in accordance with the exemplary embodiment. FIG. 3 is a simplified block diagram showing functional components of such a server 56. As shown, server 56 includes a network communication interface 300, a processor 302, and data storage 304, which may be coupled together by a system bus, network, or other mechanism 306.

Network communication interface 300 functions to connect server 56 with packet-switched network 20 so that server 56 can engage in packet-data communication over the network 20. As such, network communication interface 300 may comprise an Ethernet network interface card, a wireless network interface module (e.g., an IEEE 802.11 interface), and/or any other network interface now known or later developed.

Processor 302 may comprise one or more general purpose processors (e.g., INTEL microprocessors) and/or dedicated processors (e.g., digital signal processors). Data storage 304, in turn, may comprise one or more magnetic, optical, organic, or other storage components, whether volatile or non-volatile, and may be integrated in whole or in part with processor 302. As shown, data storage 304 preferably holds program instructions 308, transaction data 310, available-content data 312, and customized background-download data 314, among perhaps other data.

Program instructions 308 comprises machine language instructions executable by processor 302 to carry out various functions described herein. For example, program instructions 308 may comprise instructions executable by processor 302 to predict what content would be of interest to a given subscriber and to send that content in a background-download to the subscriber, in the manner described below for instance.

Transaction data 310 comprises a set of transaction records for a population of subscribers, reflecting online transactions in which the subscribers engaged over time. Server 56 preferably collects these transaction records (or some or all of the transaction data that makes up the transaction records) from the various network entities described above. For instance, the server may receive browsing history records from gateway 42 or directly from browsing history data storage 43, and the server may receive shopping history records from online store 46 or directly from shopping history data 48.

As described above, the various transaction records will preferably be keyed to subscriber-ID and will indicate the time of occurrence of the transaction. Further, each record may indicate the location of the wireless device that engaged in the transaction. Alternatively or additionally, server 56 may obtain location history records from location platform 40, or directly from location data storage 40, and may use subscriber-ID and timestamp information to programmatically associate location history records with browsing and shopping history records (e.g., enhancing browsing and shopping history records to indicate associated locations).

Server 56 may receive transaction records periodically or aperiodically through HTTP messaging. For instance, server 56 may periodically send an HTTP GET request message to each network entity noted above, requesting the latest set of event data (e.g., since the server's last request) and may receive the event data in response. Alternatively, the various network entities may send event data updates to server 56 in HTTP PUSH messages. Other messaging protocols could be used as well. Further, each incremental update can be limited to transaction records for a defined set of subscribers if desired.

Server 56 may receive each transaction record in an XML format. The server may then parse each XML-based record and store the underlying transaction data in a standalone object record in data storage 304 (e.g., using Xslt to translate the incoming XML feeds into a native format). The server may, for instance, record each transaction in a relational database record in data storage 304, to facilitate analysis of the data. Further, the server may add location or other data to the records, if not present already. In a relational database format, the records of transaction data 310 may or may not be individual records of a single table; the records could be more complex combinations of data from multiple tables. No specific structure is required.

The transaction records that server 56 maintains as transaction data 56 can take various forms. As one example, for instance, each transaction record will include (i) a subscriber-ID (such as an NAI, or encrypted NAI, for instance), (ii) an indication of the subscriber's location at the time of the transaction, (iii) the time the transaction occurred, and (iv) a description of the content that was the subject of the transaction. The content-description can be a content-description like those noted above, such as URL or other pointer to the content, or a metadata description (e.g., in XML) of content characteristics (e.g., categorizing the content based on its type, rating, size, cost, and/or one or more other parameters). Alternatively, the content-description can take other forms.

Available-content data 312 comprises a set of content records, each indicating a piece of content that is available for background-downloading to subscribers. The content may be content that is available at content sources 50, 52, for instance, or content that is stored locally at server 56, for instance. And each record in the available-content data 312 may specify a URL or other pointer to the content, and may further provide a metadata (or other) characterization of the content (e.g., as above). In another embodiment, available-content data 312 may itself contain the content, in addition to or instead of a pointer to the content. Available-content data 312 may be predefined or may be dynamically updated as new content becomes available for background-downloading.

Figure 4:
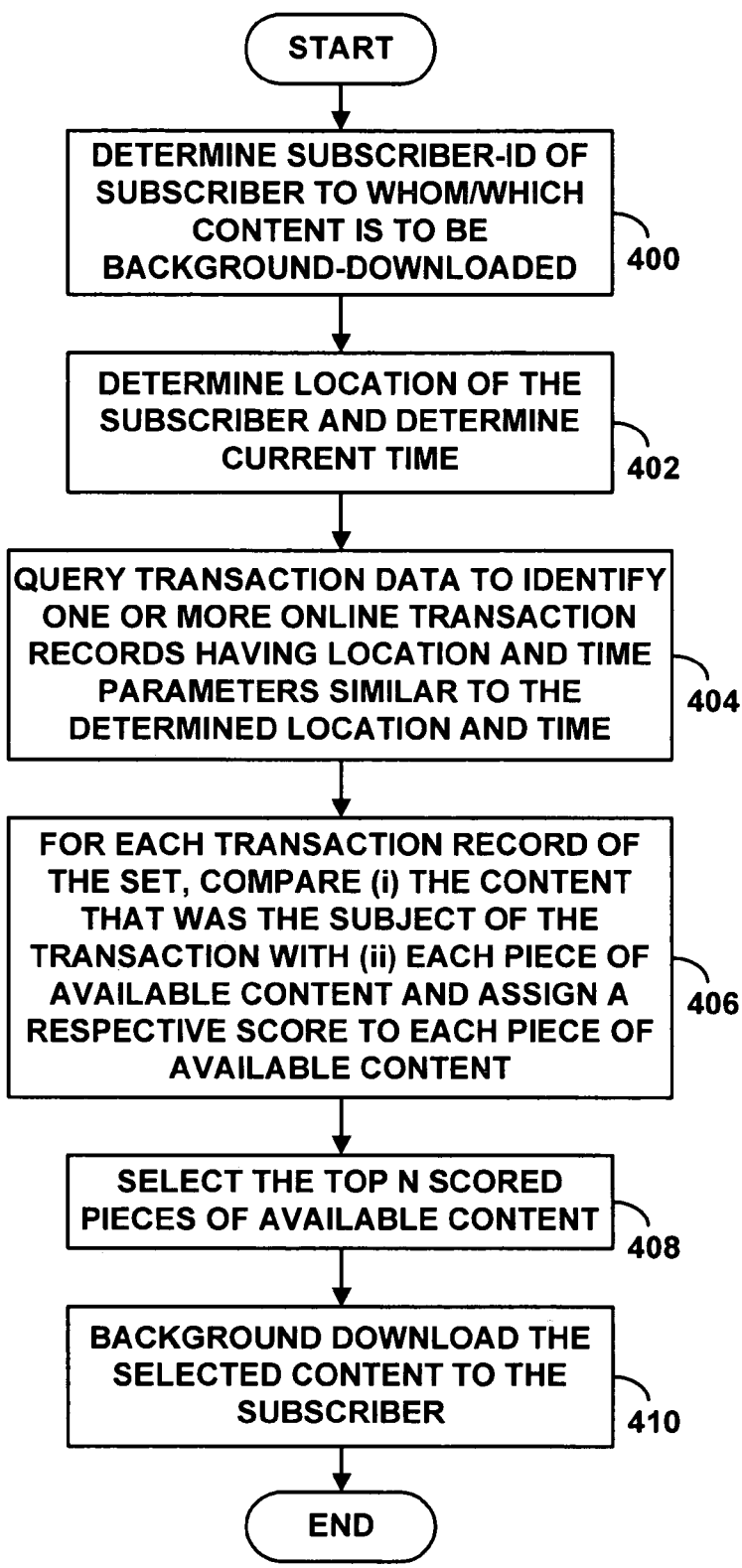
FIG. 4 is a flow chart depicting functions that can be carried out in accordance with the exemplary embodiment, to select and background-download content to a subscriber device.

Customized background-download data 314, in turn, comprises data representing content that server 56 selects for background-downloading to a particular subscriber in accordance with the exemplary embodiment. FIG. 4 is a flow chart depicting a process that server 56 may carry out in order to predict content that is likely to be relevant to a given subscriber, and to background-download that content to the subscriber, in accordance with the exemplary embodiment.

As shown in FIG. 4, at block 400, server 56 first determines the subscriber-ID of a subscriber to whom (or to which) content is to be background-downloaded. Server 56 may determine the subscriber-ID in various ways. In one embodiment, server 56 may receive a background-download request from the subscriber, e.g., as an HTTP request generated and transmitted by the subscriber, and the request may carry the subscriber-ID or may carry a parameter that the server 56 can translate into the subscriber-ID by reference to a mapping table or other data. In another embodiment, server 56 may itself initiate the background-download process, e.g., according to a predefined schedule, for one or more subscribers, obtaining each subscriber's subscriber-ID from profile data 54 for instance. Other examples are possible as well.

Once server 56 has determined the subscriber-ID, the server then determines which piece or pieces of content indicated by the available-content data 312 the server should background-download to the subscriber having that ID. In accordance with the exemplary embodiment, the server will do this by (i) selecting transaction history records that have time and location data similar to the present time and subscriber location, and then (ii) selecting available-content records describing content similar to that indicated by the selected transaction history records.

To facilitate this, at block 402, server 56 will determine the location of the subscriber at issue and may further determine the current time. The server may determine the subscriber's location (at any desired degree of granularity) by querying location platform 38, e.g., based on the determined subscriber-ID. Alternatively, if the server 56 is responding to a background-download request from the subscriber, the subscriber could have automatically included an indication of its GPS-determined location in the request, e.g., as an HTTP query parameter. The server may determine the current time by reference to an internal clock.

At block 404, provided with the subscriber's location and the current time, server 56 will then query the transaction data 310 to obtain a set of one or more transaction records that have location and time parameters within a certain tolerance of the determined location and time. For instance, the server may search for records having the same location and time, or records having a location within a certain geographic distance of the determined location and having a time within a certain range around the determined time.

In a preferred embodiment, the server will limit its query of the transaction data to search for just transaction records for the subscriber at issue, i.e., those having the determined subscriber-ID. That way, the analysis will be focused on the subscriber's own past transaction history. In an alternative embodiment, however, the server may more broadly search for any transaction records matching the location and time, whether or not the records are for the subscriber's own past transactions. In a scenario where the subscriber does not yet have any recorded transactions (e.g., if the subscriber is new), the process would still usefully take into consideration transaction records of other subscribers that have similar or identical time and location data.

At block 406, for each transaction record in the resulting set of one or more transaction records, server 56 will compare the content indicated by the transaction record with each piece of available-content indicated by the available-content data 312, and the server will assign a score respectively to each piece of available content based on the similarity. To perform each such comparison, the server may compute a Euclidian distance between the metadata characterizations of the content indicated by the transaction record and the content indicated by the available-content data record. A score of 1 may indicate a perfect match, i.e., the same exact content, and a score of 0 may indicate no relationship whatsoever between the content. The server may be programmed with weighing data that specifies weights to give various content characteristics (such as content type, category, rating, etc.), for purposes of performing this comparison and scoring. As a result, the server 56 may produce a plurality of scores (for each piece of available content, one score for each transaction record at issue).

At block 408, the server will then select the pieces of available-content having the top N scores, i.e., the content deemed to be most similar to the content of the identified past transaction records. The value N is a matter of design choice, reflecting how much content the server should background-download in each instance. For instance, the server may select the top five scoring pieces of available content.

Preferably, the server will exclude from this selection process any piece of available-content that is identical to content in any of the transaction records used for the comparison, where the subscriber-ID is the same. Alternatively, for each piece of selected available content, the server may search through the transaction records to see if any transaction records for the subscriber at issue indicate the same content, and, if so, the server may eliminate the available content from the selection group. That way, the server can avoid background-downloading to the subscriber a piece of content that the subscriber already received once before.

The end result of the process so far is for the server to select content that is likely to be of interest to the subscriber, based on consideration of time, location, and content-description. In particular, the server has selected transaction records that are similar or the same in time and location to the current time and the subscriber's current location, and the server has then selected content that is most similar to the content that was the subject of those selected transaction records. Thus, if past transaction records show that subscribers (or the particular subscriber at issue) tend to browse to particular types of websites or purchase particular type of content when at a certain location at a certain time, the server can logically conclude that the subscriber at issue would be interested in similar content when at (or near) the same location at (or near) the same time.

As a specific example, if the past transaction records show that subscribers (or the particular subscriber at issue) tend to download pop-music ringtones when located in urban areas on Friday or Saturday nights, then it may be logical to conclude that, if the subscriber at issue is located in an urban area on a Friday or Saturday night, the subscriber is likely to be interested in pop-music ringtones. Thus, the server may logically select a pop-music ringtone, or link to such a ringtone, to background-download to the subscriber at that time.

At block 410, the server will then background-download the selected content to the subscriber. To do so, if the server has selected multiple pieces of content to background-download, the server may aggregate the content together into a single block of content. For instance, if the server has selected several URLs or web pages to deliver to the subscriber, the server may retrieve and combine the URLs or web pages together into a unitary web page (e.g., with frames or the like). If the server does not itself have the content, the server may obtain the content from one or more servers, such as content sources 50, 52.

The server may background-download the selected content to the subscriber in various ways. For example, if the subscriber had sent a background-download request to the server, as an HTTP request for instance, then the server may deliver the selected content to the subscriber in a response to that request, such as in an HTTP response message for instance. Alternatively, if the server has autonomously (e.g., per a schedule) begun the background-download process for the subscriber, the server may push the selected content to the subscriber, such as via MMS messaging for instance. Other background-download delivery mechanisms are possible as well.

As noted above, this customized background downloading function can be usefully employed to provide a customized content channel for presentation to a user through a channel-presentation program. For instance, the subscriber device could include a channel-presentation program and a "custom channel" definition that points to a URL from which the device can automatically background-download updates to the custom channel. Server 56 may host that URL. Thus, when server 56 receives an HTTP request from the subscriber seeking to background-download a new update of the custom channel, server 56 may carry out the process described above to select content predicted to be of interest to the subscriber, and server 56 may background-download that content as the custom channel definition to the subscriber.

In addition, as noted above, the customized background downloading function can be usefully employed to provide a customized content-catalog to a subscriber device. In this case, the content that server 56 selects to background download to the subscriber may be mere URLs or other links to content. Further, the available-content data 312 may list all entries in an online content catalog. Thus, through the process described above, server 56 may effectively establish an abridged version of the content-catalog, including catalog items that the server 56 has predicted to be of interest to the subscriber. Since the server is sending only (or primarily only) content-links in this instance, rather the content itself, the number of pieces of content (i.e., the number of links), N, that the server selects could be set to be much higher than it might be set to be for the custom content-channel embodiment.

In an further enhancement, when a subscriber device requests a background-download of a custom content-catalog, content-channel, or other content, the subscriber device may automatically include as a query parameter in its request an indication of the amount of storage space that it has available for storing the requested content. (The storage space indicated can be the total amount of data storage space currently unused on the device, or it could be an indication of how much storage space the device is programmed to allow for use to store the requested content, which might be specified by user input/configuration of the device in advance.)

Server 56 may then use that indicated storage space value as a basis to determine how much content to background-download to the device. For instance, based on the indicated storage space value, server 56 may adjust the value, N, that server 56 uses when selecting pieces of content to background-download to the device, using higher values of N when more storage space is available, and vice versa.

Finally, as further noted above, a subscriber device can be set to automatically vary the frequency with which it engages in these and/or other background-downloads, based on the frequency with which a user of the device tends to access the background-downloaded content on the device. As noted above, device 200 (in FIG. 2) may include executable program logic for carrying out this function. The program logic may be included as part of a particular application, such as a channel-presentation program or a content-catalog presentation program. Or the program logic may reside separately in the device.

Figure 5:
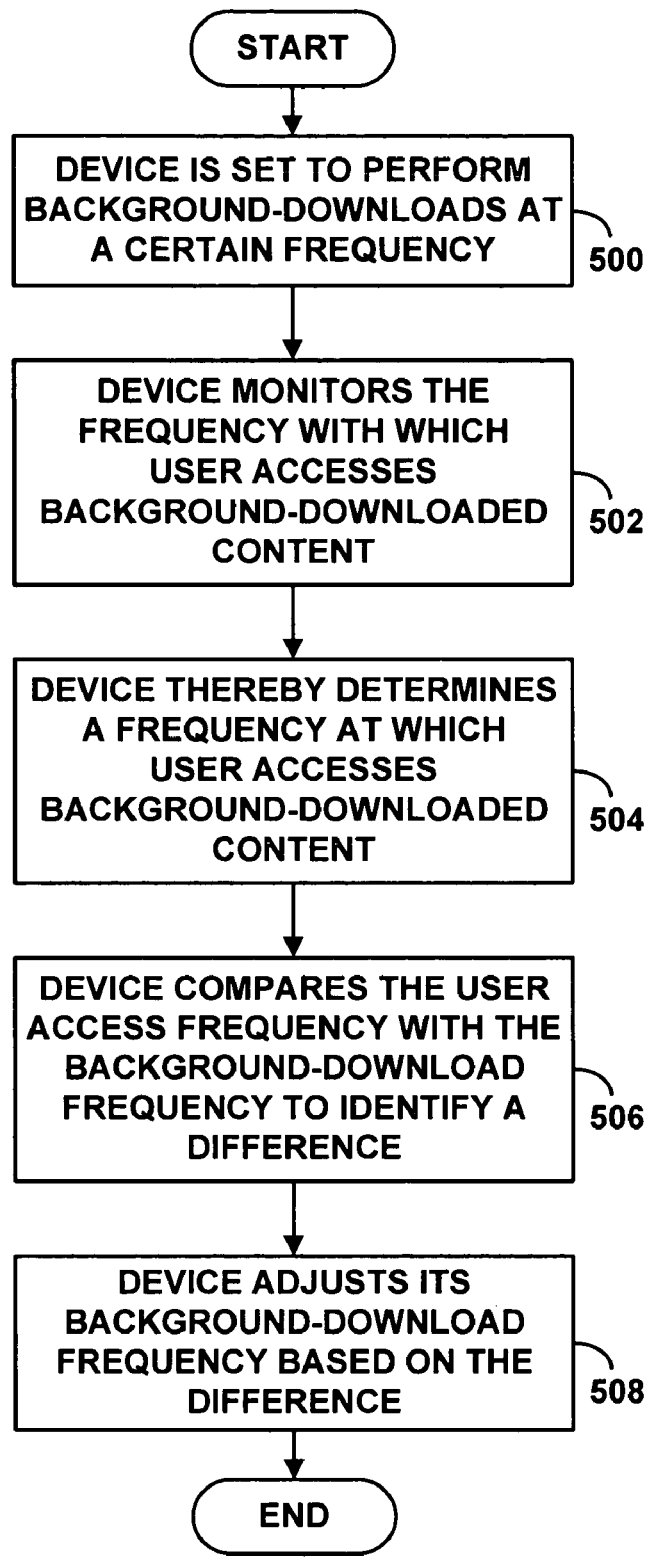
FIG. 5 is a flow chart depicting functions that can be carried out in accordance with the exemplary embodiment, to automatically change background-download frequency based on the frequency with which background-downloaded content tends to be accessed.

FIG. 5 is a flow chart depicting functions that the device can carry out in accordance with this further embodiment. As shown in FIG. 5, at block 500, the device is set (by default or through this process) to perform background-downloads at a certain frequency. For instance, the device may be set to request a background-download of a custom content-channel and/or custom content-catalog every three hours. Thus, every three hours, the device may automatically send a background-download request to a designated network address and receive and store content in response for later access by a user.

At block 502, the device programmatically monitors the frequency with which a user accesses background-downloaded content. The device may carry out this monitoring function with respect to just a particular type of background-downloaded content, such as a channel definitions or content-catalogs for instance (whether or not customized in accordance with the process described above). Or the device may carry out this monitoring function with respect to multiple types of background-downloaded content, such as both a channel-definitions and content-catalogs, and/or other types of background-downloaded content. The frequency with which a user accesses background-downloaded content may be measured as a number of times per hour, day, week, or other increment.

The function of a user accessing background-downloaded content may comprise the user navigating through a program to select the content to view on a display screen of user interface 204 for instance. For instance, through a channel-presentation program, the user may select the "custom-channel" from a channel listing, and so the device may present the latest background-downloaded custom channel to the user. Similarly, through a content-management application, the user may select a menu item to view a content-catalog, and the device may responsively present the latest background-downloaded custom content-catalog to the user. Thus, the device may monitor frequency of access by maintaining a record of the time when the device receives a request to present such background-downloaded content, and by maintaining a running average of the duration between successive presentation requests.

At block 504, based on the monitoring, the device determines that a user tends to access background-downloaded content at a particular frequency (e.g., that the running average is at a certain level). The device may make this determine again each time the user accesses background-downloaded content.

At block 506, the device then compares the frequency at which the user tends to access background-downloaded content with the current frequency at which the device background-downloads content, to identify a difference between the two. At block 508, the device then adjusts the frequency with which it background downloads content based on the identified difference. For example, if the device determines that the user tends to access background-downloaded content more frequently (e.g., by a threshold extent) than the device is currently set to perform background-downloads, then the device may programmatically increase its frequency of performing background-downloads. As another example, if the device determines that the user tends to access background-downloaded content less frequently (e.g., by a threshold extent) than the device is currently set to perform background downloads, then the device may programmatically decrease its frequency of performing background-downloads. The extent of the increase or decrease is a matter of design choice.

Exemplary embodiments have been described above. It should be understood, however, that variations from the embodiments discussed are possible, while remaining within the true spirit and scope of the invention as claimed.

For example, although the foregoing is focused primarily on interactions with wireless communication devices, the arrangements and processes described could be extended by analogy to use with respect to landline devices such as personal computers for instance (with location determined by network port or any other mechanism now know or later developed), or more generally any subscriber devices. Other variations are possible as well.

We claim:

1. In a communication device, a method comprising:
 determining a difference between a frequency of user-access of background-downloaded content on the device and a frequency at which the device background-downloads content; and
 based at least on the determined difference, automatically adjusting the frequency at which the device background-downloads content;
 wherein automatically adjusting a frequency at which the device background-downloads content comprises:
 if the frequency of user-access of background-downloaded content is greater than the frequency at which the device background-downloads content, then increasing the frequency at which the device background-downloads content;
 and if the frequency of user-access of background-downloaded content is less than the frequency at which the device background-downloads content, then decreasing the frequency at which the device background-downloads content.

2. The method of claim 1, wherein the communication device comprises a cellular wireless device.

3. The method of claim 2, wherein the communication device comprises a cell phone.

4. The method of claim 2, wherein the communication device comprises a personal digital assistant.

5. The method of claim 1, wherein the background-downloaded content comprises one or more channel-definitions for a channel-presentation program.

6. The method of claim 1, wherein the background-downloaded content comprises a content-catalog.

7. The method of claim 1, wherein the frequency of user-access of background-downloaded content on the device comprises:
 a running average of time passage between instances of user-access of background-downloaded content on the device.

8. The method of claim 1, further comprising performing the determining and adjusting functions in response to user-access of background-downloaded content on the device.

9. The method of claim 1, wherein automatically adjusting the frequency at which the device background-downloads content comprises:
  if the frequency of user-access of background-downloaded content is greater than the frequency at which the device background-downloads content, then increasing the frequency at which the device background-downloads content; and
  if the frequency of user-access of background-downloaded content is less than the frequency at which the device background-downloads content, then decreasing the frequency at which the device background-downloads content.

10. The method of claim 1, further comprising background-downloading content at the adjusted frequency via a wireless communication interface.

11. The method of claim 1, further comprising:
  including in a background-download request an indication of storage space available on the device for storing requested content, to facilitate a determination of how much content should be provided to the device in response to the request.

12. An apparatus comprising:
  a communication interface;
  a user interface;
  a processor;
  data storage;
  program logic stored in the data storage and executable by the processor to (i) determine a difference between a frequency of user-access of background-downloaded content on the apparatus and a frequency at which the device background-downloads content, and (ii) based at least on the determined difference, automatically adjust the frequency at which the apparatus background-downloads content via the communication interface;
wherein automatically adjusting a frequency at which the device background-downloads content comprises:
  if the frequency of user-access of background-downloaded content is greater than the frequency at which the device background-downloads content, then increasing the frequency at which the device background-downloads content;
  and if the frequency of user-access of background-downloaded content is less than the frequency at which the device background-downloads content, then decreasing the frequency at which the device background-downloads content.

13. The apparatus of claim 12, wherein the communication interface comprises a wireless communication interface supporting communication over an air interface with a radio access network (RAN), and wherein the apparatus background-downloads content from one or more content servers on a packet-switched network via the RAN.

14. The apparatus of claim 13, wherein the apparatus comprises any of a cell phone, a personal digital assistant, and a wirelessly-equipped personal computer.

15. The apparatus of claim 12, wherein the background-downloaded content comprises one or more channel-definitions for a channel presentation program.

16. The apparatus of claim 12, wherein the background-downloaded content comprises a content-catalog.

17. The apparatus of claim 12, wherein the frequency of user-access of background-downloaded content on the apparatus comprises:
  a running average of time passage between instances of user-access of background-downloaded content on the apparatus.

18. The apparatus of claim 12, wherein the program logic is executable by the processor to perform the determining and adjusting functions in response to user-access of background-downloaded content on the apparatus.

19. The method of claim 12, wherein the program logic is executable by the processor to adjust the frequency at which the apparatus background-downloads content by a process comprising:
  if the frequency of user-access of background-downloaded content is greater than the frequency at which the apparatus background-downloads content, then increasing the frequency at which the apparatus background-downloads content; and
  if the frequency of user-access of background-downloaded content is less than the frequency at which the apparatus background-downloads content, then decreasing the frequency at which the apparatus background-downloads content.

* * * * *